US009176226B1

(12) United States Patent
Sego

(10) Patent No.: US 9,176,226 B1
(45) Date of Patent: Nov. 3, 2015

(54) RADAR TOMOGRAPHY USING DOPPLER-BASED PROJECTIONS

(75) Inventor: Daniel J. Sego, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 888 days.

(21) Appl. No.: 13/420,083

(22) Filed: Mar. 14, 2012

(51) Int. Cl.
*G01S 13/90* (2006.01)

(52) U.S. Cl.
CPC ............. *G01S 13/90* (2013.01); *G01S 13/9029* (2013.01)

(58) Field of Classification Search
CPC ................ G01S 13/90; G01S 13/9029; G01S 2013/9064; G01S 2013/9076
USPC .................................. 342/25, 109, 25 B, 25 F
See application file for complete search history.

(56) References Cited

U.S. PATENT DOCUMENTS

| 4,965,582 A * | 10/1990 | Hellsten ...................... 342/25 A |
| 2009/0102705 A1 * | 4/2009 | Obermeyer .................. 342/25 F |

OTHER PUBLICATIONS

Borden, Brett, et al., Synthetic-apperture imaging from high-Doppler-resolution measurements, Institute of Physics Publishing, Inverse Problems, 21:1-11 (2005).
Bracken, L. Justin E., et al., Ultra Narrow Band Adaptive Tomographic Radar, AFRL Sensors Directorate, *L3-Communications, 7 pgs.(no publication date).
Jain, A.K., Fundamentals of Digital Image Processing, Image Reconstruction from Projections, Chapter 10 entitled Image Reconstruction from Projection, Prentice Hall Information and Sciences Systems Englewood Cliffs, NJ, 431-451 (1989).
Jersak, Brian D., et al., Application of Holographic Synthetic Aperture Radar Techniques to Monochromatic Swept-Angle Bistatic Data, pp. 1337-1340 IEEE Xplore (1995).
Knaell, K.K., et al., Radar Tomography for the generation of three-dimensional images, IEEE Proc.-Radar, Sonar Navig., 142(2):54-60 (1995).
Mensa, Dean L., et al, Coherent Doppler Tomography for Microwave Imaging, Proceedings of the IEEE, 71(2):254-261 (1983).
Norton, Stephen J., et al., Ultrasonic Reflectivity Imaging in Three Dimensions: Exact Inverse Scattering Solutions for Plane, Cylindrical, and Spherical Apertures, IEEE TransactionsBiomedical Engineering, 28(2):202-220 (1981).
Sego, Daniel J., et al., Waveform Design for Low Frequency Tomography, 2010 Waveform Design and Diversity Conference, Niagara Falls, CA, Aug. 2010, 8 pgs.
Sego, Daniel J., et al., Tomography Using Doppler-Based Projections, RadarCon '11, May 11, Kansas City, MO, 12 pgs.
Wikipedia; "Carrier signal," Retrieved from the Internet on May 21, 2015, <http://en.wikipedia.org/wiki/Carrier_signal>.

* cited by examiner

*Primary Examiner* — Timothy A Brainard
(74) *Attorney, Agent, or Firm* — Charles L. Moore; Moore & Van Allen PLLC

(57) ABSTRACT

A method for generating an image may include translating a radar system about a target area at a selected angular rate and at a predetermined radius from the target area and transmitting a plurality of radar signals in a predetermined frequency range from the radar system as the radar system is translated about the target area. The method may also include collecting a plurality of backscattered radar signals from the target area resulting from the plurality of transmitted radar signals and forming a plurality of Doppler-based projections from the plurality of backscattered radar signals. The method may further include generating an image of the target area using radar tomography and the Doppler-based projections.

20 Claims, 11 Drawing Sheets

RADAR TOMOGRAPHY USING DOPPLER-BASED PROJECTIONS

BACKGROUND

Aspects of the present disclosure relate to generating images using radar (reflection) tomography, and more particularly to a method, system and computer program product for generating images from return or backscattered radar signals and using radar tomography and Doppler-based projections.

Obtaining a high resolution image of a target area is desirable under certain circumstances or situations, such as surveillance, detecting unauthorized entry in an area, monitoring changes, locating a particular object or similar circumstance. Images generated by standard photographic techniques may be inadequate or not possible because environmental conditions or other conditions obscuring the target area. Additionally, only a two dimensional image can be obtained using standard photographic or imaging techniques.

Radar tomography is a technique for generating three-dimensional images using radar signals; however, radar tomography is also not without certain limitations. For example, a three-dimensional image may be generated or reconstructed at low operating frequencies suitable for penetrating intervening dielectric media, such as foliage or other intervening or obstructing material but a well behaved point spread function is required to provide a quality image. By well behaved point spread function, the response needs to have sufficient resolution and a side lobe pattern which minimizes the contribution of the response at other spatial positions. This is analogous to crosstalk or mutual interference. The response should also minimize contributions due to scattering objects that are outside or beyond the scene area to be imaged so that the image reconstruction can best reproduce the imaged object. Standard tomographic techniques or devices may achieve this by radiating or transmitting a waveform with a high bandwidth while collecting backscattered or return signals using a three-dimensional tomographic aperture. High bandwidth in the context of radar bandwidths may be approximately 10%-15% of the carrier frequency, or more. At low frequencies associated with good penetration of intervening dielectric media, there is insufficient (and shrinking) spectrum, limiting the bandwidth available. Additionally, wideband, low frequency antennas are physically large and ill-suited for integration with small airborne platforms, such as an unmanned aerial vehicles (UAV), usually used for surveillance and other purposes.

BRIEF SUMMARY

According to one aspect of the present disclosure, a method for generating an image may include translating a radar system about a target area at a selected angular rate and at a predetermined radius from the target area and transmitting a plurality of radar signals in a predetermined frequency range from the radar system as the radar system is translated about the target area. The method may also include collecting a plurality of backscattered radar signals from the target area resulting from the plurality of transmitted radar signals and forming a plurality of Doppler-based projections from the plurality of backscattered radar signals. The Doppler based projections are derived through the generation of contiguous, overlapping synthetic subapertures. The method may further include generating an image of the target area using radar tomography and the Doppler-based projections.

According to another aspect of the present disclosure, a system for generating an image may include a radar system mountable to a vehicle for translating the radar system about a target area at a selected angular rate and at a predetermined radius from the target area. The system may also include an antenna associated with the radar system that transmits a plurality of radar signals in a predetermined frequency range from the radar system as the radar system is translated about the target area. The system may additionally include a collection aperture that collects a plurality of backscattered narrowband radar signals from the target area resulting from the plurality of transmitted radar signals. The system may further include a processor adapted to form a plurality of Doppler-based projections from the plurality of backscattered radar signals and to generate an image of the target area using radar tomography and the Doppler-based projections.

According to a further aspect of the present disclosure, a computer program product for generating an image may include a computer readable storage medium having computer readable program code embodied therewith. The computer readable program code may include computer readable program code configured to transmit a plurality of radar signals in a predetermined frequency range from a radar system as the radar system is translated about a target area. The computer readable program code may also include computer readable program code configured to collect a plurality of backscattered radar signals from the target area resulting from the plurality of transmitted radar signals. The computer readable program code may additionally include computer readable program code configured to form a plurality of Doppler-based projections from the plurality of backscattered radar signals. The computer readable program code may further include computer readable program code configured to generate an image of the target area using radar tomography and the Doppler-based projections.

BRIEF DESCRIPTION OF THE SEVERAL VIEWS OF THE DRAWINGS

The present disclosure is further described in the detailed description which follows in reference to the noted plurality of drawings by way of non-limiting examples of embodiments of the present disclosure in which like reference numerals represent similar parts throughout the several views of the drawings and wherein.

DETAILED DESCRIPTION

Figure 1:
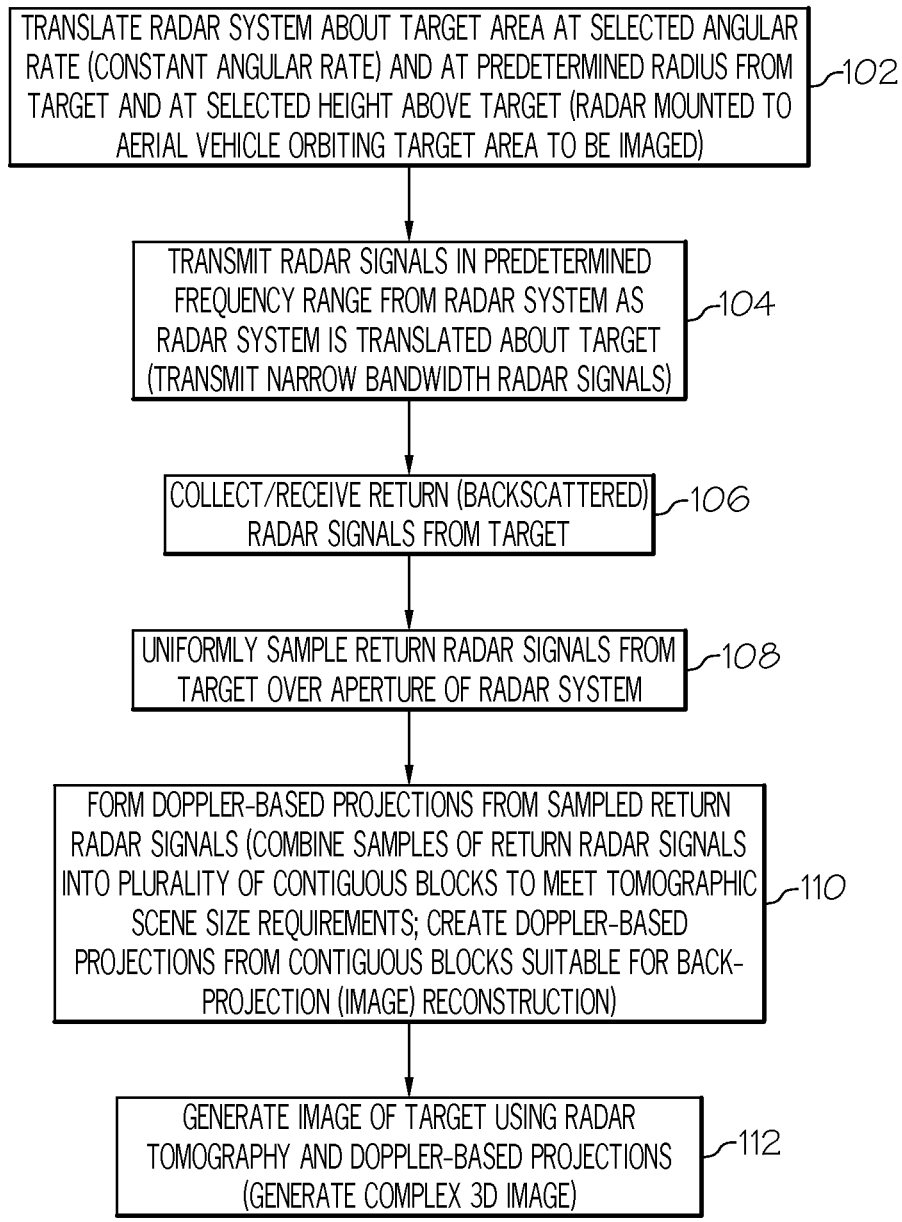
FIG. 1 is a flow chart of an example of a method for generating images using radar tomography and Doppler-based projections in accordance with an embodiment of the present disclosure.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing. Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 is a flow chart of an example of a method 100 for generating images using radar tomography and Doppler-based projections in accordance with an embodiment of the present disclosure. In block 102, a radar system for generating images using radar tomography and Doppler-based projections may be translated about a target area at a selected angular rate and at a predetermined radius from the target or target area. The selected angular rate may be a constant angular rate. An example of a radar system for generating images using radar tomography and Doppler-based projections will be described herein with reference to FIG. 3.

Figure 2:
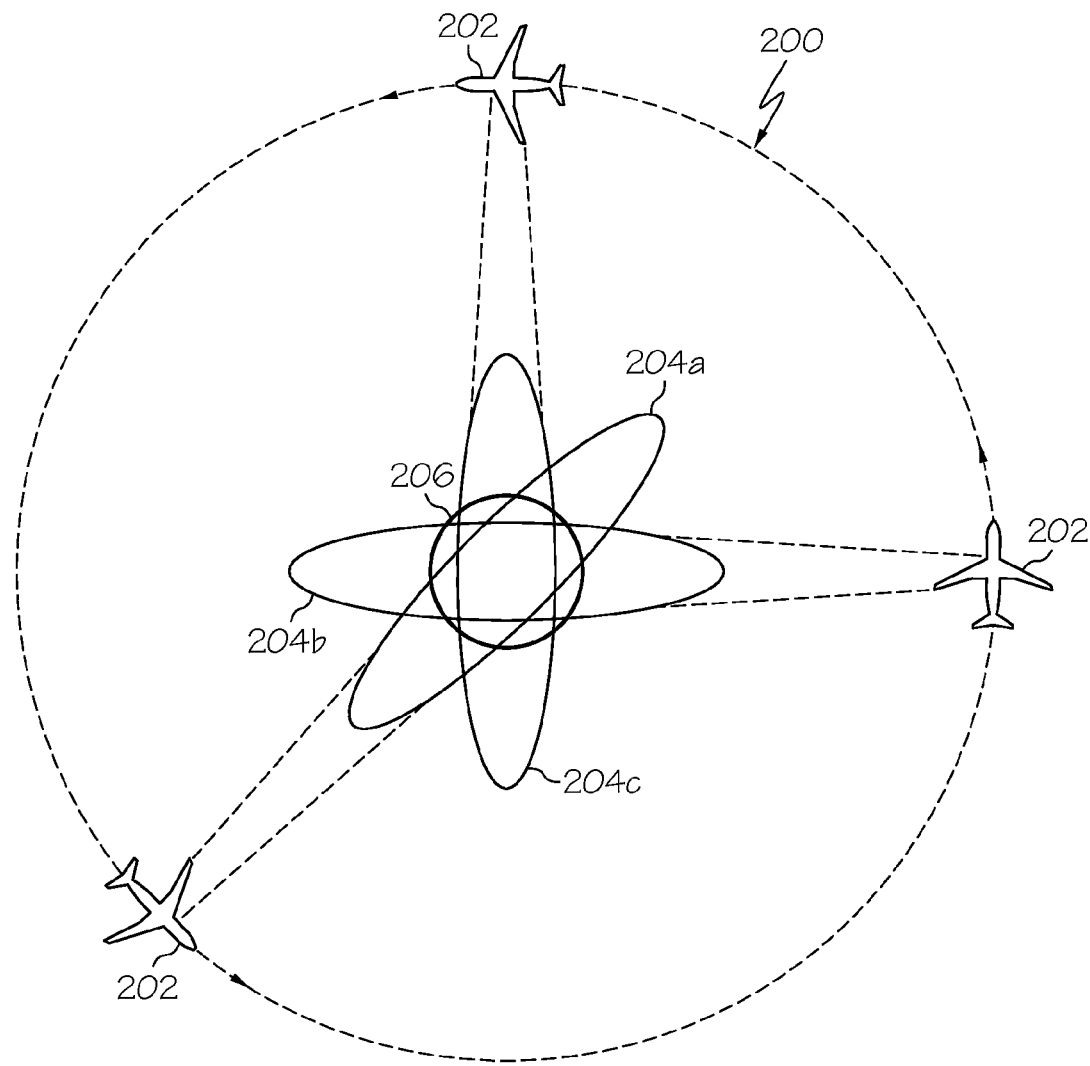
FIG. 2 is an illustration of an example of a flight path of an aerial vehicle and antenna pattern for generating images using radar tomography and Doppler-based projections in accordance with an embodiment of the present disclosure.

The radar system for generating images using radar tomography and Doppler-based projections may be mounted to an aerial vehicle, such as a UAV or other aerial platform. The radar system may then the translated about a target area similar to that illustrated in FIG. 2 (shown in two dimensions). FIG. 2 is an illustration of an example of a flight path 200 of aerial vehicle 202 or multiple aerial vehicles 202 and depicts the locus of points commonly illuminated by the antenna pattern over the collection aperture. A radar system is mounted to the aerial vehicle 202.

Figure 3A:
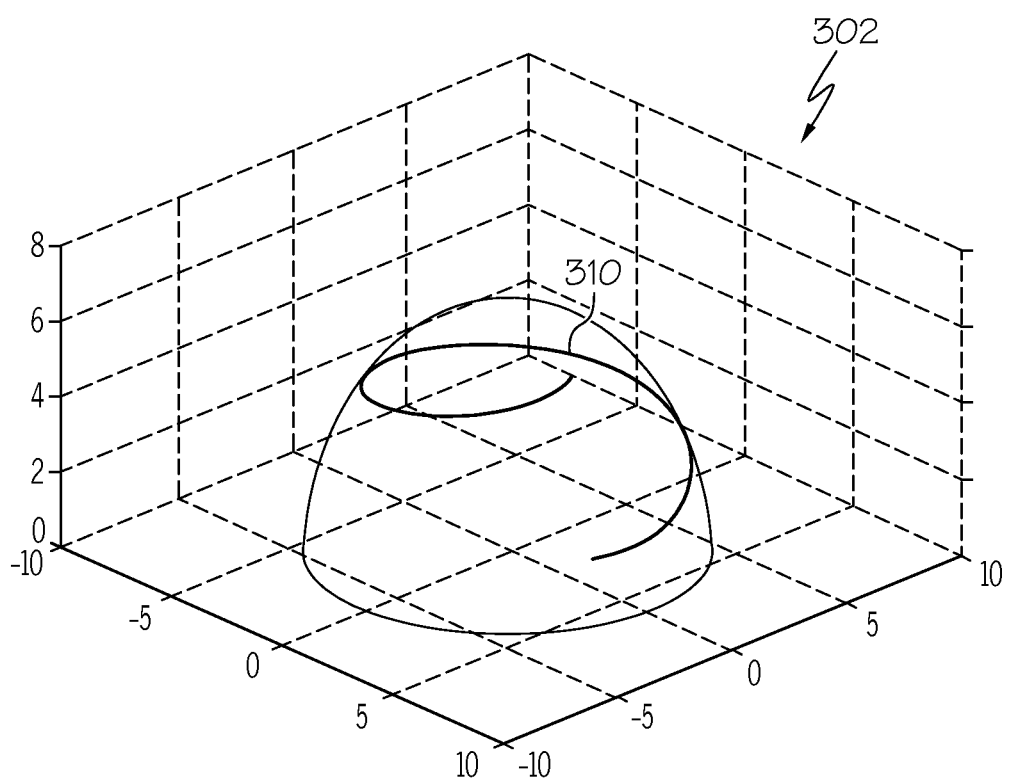
FIGS. 3A-3C illustrate examples of possible three dimensional flight trajectories to generate a three dimensional image in accordance with embodiments of the present disclosure.
Figure 3B:
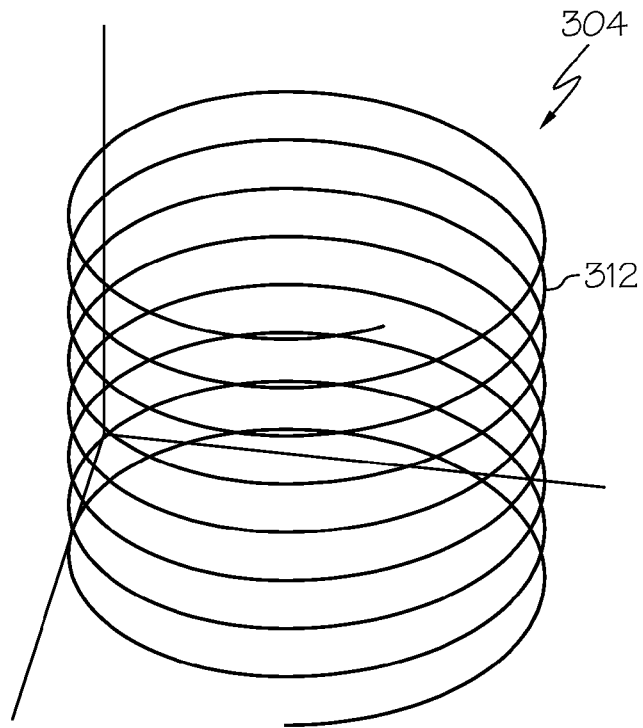
Figure 3C:
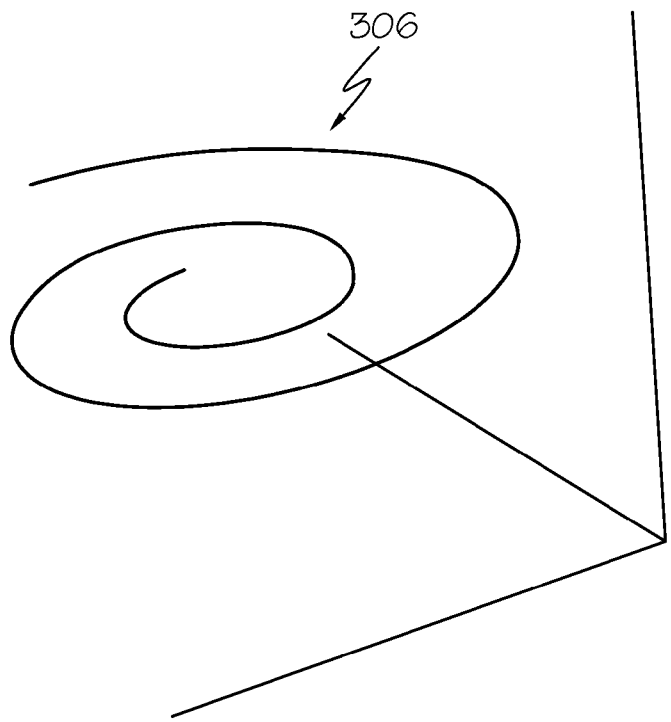

FIGS. 3A-3B illustrate examples of possible three dimensional flight trajectories to generate a three dimensional image in accordance with embodiments of the present disclosure. FIGS. 3A-3B are each a representation of possible three dimensional collection apertures, demonstrating trajectories associated with the generation of three dimensional images. However, these are not a complete set of all possible trajectories but convey the essentials of sampling the scene to be imaged over angular space. FIG. 3A is an example of a spherical spiral flight trajectory 302 for collecting a three-dimensional aperture. FIG. 3B is an example of a cylindrical spiral flight trajectory 304 for collection of a three-dimensional (3D) aperture and FIG. 3C is an example of a planar spherical flight trajectory 306 for collecting a three-dimensional aperture. The respective flight trajectories 302, 304 and 306 continuously sample a scene over both azimuth and elevation dimensions relative to a scene centered coordinate frame. The spherical spiral trajectory 302 maintains a constant range to scene center over the azimuth orbits executed while ascending or descending. In FIG. 3A a single orbit 310 is depicted as scribed onto a hemispherical shape which is included for purposes of illustration. The cylindrical spiral 304 in FIG. 3B maintains a constant radius from scene center in the horizontal plane of the scene over the number of orbits 312 around the scene. With the planar spiral 306 in FIG. 3C, the aperture is collected at a single altitude in some spiral (for example logarithmic) relative to the scene local vertical (zenith) coordinate axis.

Figure 4:
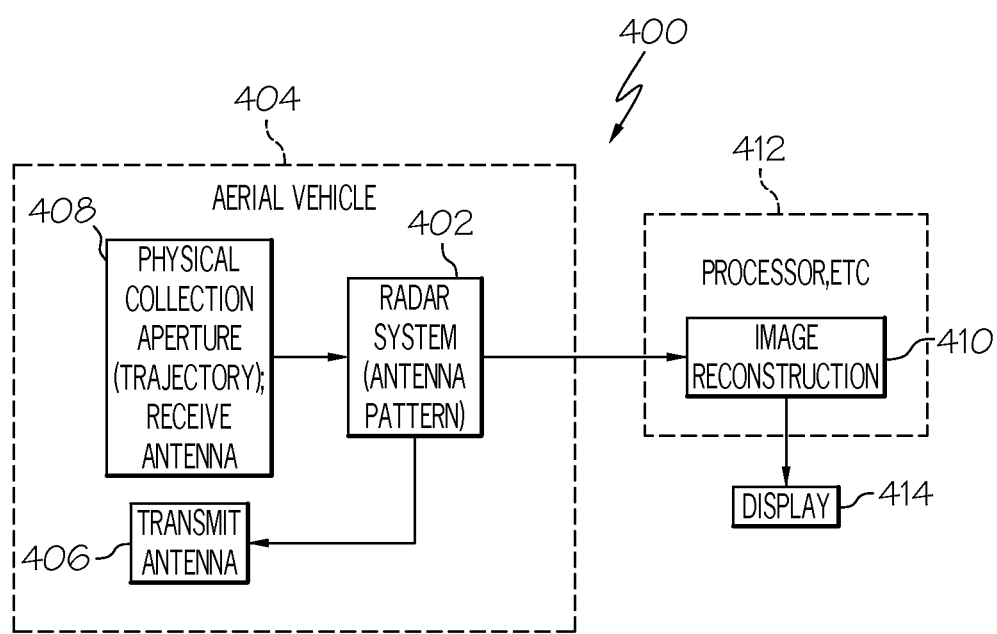
FIG. 4 is a block schematic diagram of an example of a system for generating images using radar tomography and Doppler-based projections in accordance with an embodiment of the present disclosure.

As will be described with reference to FIG. 4, the radar system may include a transmit antenna to transmit radar signals and a receive antenna or physical collection aperture to receive return or backscattered radar signals from a target area 206. The transmit antenna and the received antenna may also be the same antenna or separate antennas as illustrated in FIG. 4. The antenna or antennas may transmit and receive radiation or signals in a radiation or antenna pattern similar to the exemplary radiation or antenna patterns 204a-204c for generating images using radar tomography and Doppler-based projections in accordance with an embodiment of the present disclosure. Only three antenna patterns 204a-204c are illustrated in FIG. 2; however, the radar system mounted to the aerial vehicle 202 may transmit radar signals and collect or receive return or backscattered radar signals associated with a multiplicity of antenna patterns or nearly continuously as the radar system is translated about the target area 206 by the aerial vehicle 202 at the selected angular rate, the predetermined radius and at a selected height or altitude above the target area 206. The target area 206 may be defined by the intersection of the antenna or radiation patterns 204a-204c over the radar system aperture. The target area 206 defines a "reconstructable" area. As described herein a three-dimensional (3D) image may be generated or reconstructed of the target area 206. This is extended directly to the 3D apertures of FIGS. 3A-3C by the inclusion of the physical antenna elevation pattern and the projection of the full antenna pattern onto the ground plane at the scene.

Returning to FIG. 1, in block 104, radar signals may be transmitted in a predetermined frequency range or bandwidth from the radar system as the radar system is translated about the target or target area. The predetermined frequency range may correspond to narrow bandwidth radar signals. The narrow bandwidth radar signals may be defined as instantaneous operating bandwidths that are less than about 10% of the carrier frequency. For example, for a carrier frequency of 400 Mega Hertz (MHz), the radar signal is typically considered narrowband if the maximum instantaneous bandwidth is less than or equal to about 40 MHz. Likewise the bandwidth may be constrained to some small spectral region by international agreements on spectral allocation.

In block 106, return or backscattered radar signals may be collected or received from the target area. The return or backscattered radar signals may be collected by a physical collection aperture or antenna having a predetermined trajectory.

In block 108, the return radar signals from the target area may be uniformly sampled at a predetermined interval over the aperture angle of the radar system. The return radar signals or backscattered signal may be uniformly sampled at a rate consistent with the beam width of the antenna of the radar system and ground speed of the radar system, as derived from minimal aliasing requirements of the synthetic subapertures used for the development of the Doppler-based projections. Temporal sampling requirements or the sampling interval may be driven by specific properties of the waveform of the response or return radar signals, in conjunction with any time gating to limit the location and range extent of the collected samples. There may also be spatial sampling constraints that associate the phase-artifact-free region of the image with an interval between spatial samples.

In block 110, Doppler-based projections may be formed from the sampled return radar signals. An example of forming Doppler-based projections will be described with reference to FIG. 6. The samples of return radar signals may be combined into a plurality of contiguous blocks to meet tomographic scene size requirements. The Doppler-based projections may be formed from the contiguous blocks suitable for back-projection (image) reconstruction. The Doppler based projections are derived through the generation of contiguous, overlapping synthetic subapertures.

In block 112, an image of the target area may be generated using radar tomography and Doppler-based projections. Using the techniques described herein, a complex three-dimensional image may be generated. An example of generating three-dimensional image using radar tomography and Doppler-based projections will also be described with reference to FIG. 5.

FIG. 4 is a block schematic diagram of an example of a system 400 for generating images using radar tomography and Doppler-based projections in accordance with an embodiment of the present disclosure. The method 100 may be embodied in and performed by the system 400. The system 400 may include a radar system 402. The radar system 402 may be mounted in an aerial vehicle 404 or other vehicle or structure depending on the purpose or environment for generating the images. The radar system 402 may include or may be coupled to a transmit antenna 406 and a physical collection aperture or receive antenna 408. The radar system 402 and antennas 406 and 408 are adapted to generate a radiation or antenna pattern such that the target area to be imaged and reconstructed is illuminated by the main beam of the antenna pattern over the complete trajectory of the radar system. The radar system 402 generates radar signals at low frequencies, for example, in the very high frequency (VHF, about 30 MHz-300 MHz) to L band to provide predetermined waveform and bandwidth characteristics that are capable of penetrating dielectric media, such as foliage or other media.

The system 400 also includes an image reconstruction module 410 for generating the three-dimensional image of the target area using radar tomography and Doppler-based projections. The image reconstruction module 410 operates on a processor 412 or similar computing device. The processor 412 and image reconstruction module 410 may also be mounted in the aerial vehicle 404 or maybe located at a ground station. The radar signals received by the radar system 402 may be transmitted to the image reconstruction module 410 via a suitable communications channel. The image generated or reconstructed using the radar tomography and Doppler-based projections may be presented on a display 414.

Figure 5A:
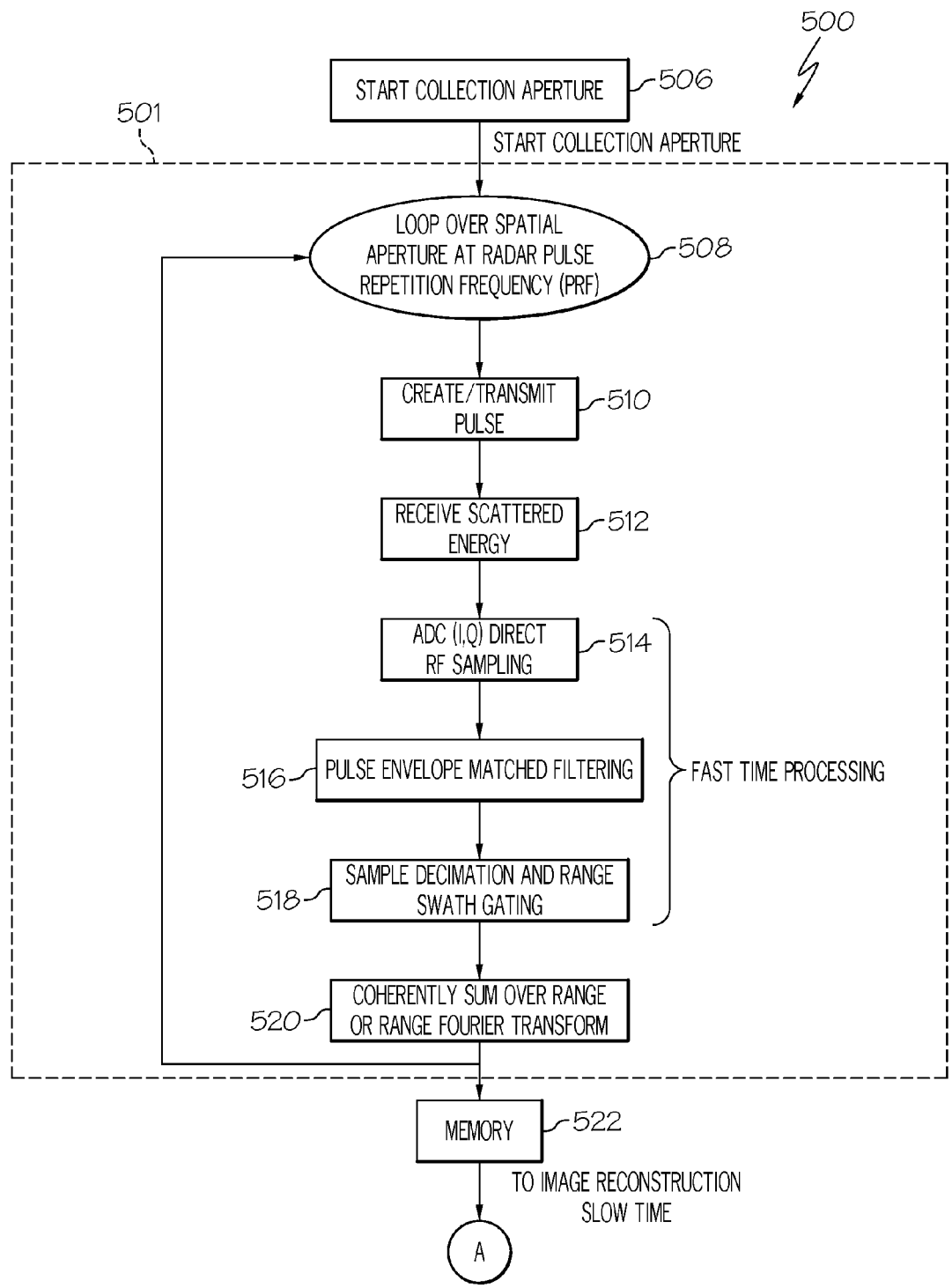
FIGS. 5A-5C (collectively FIG. 5) are a flow chart of an example of a method for image reconstruction in accordance with an embodiment of the present disclosure.
Figure 5B:
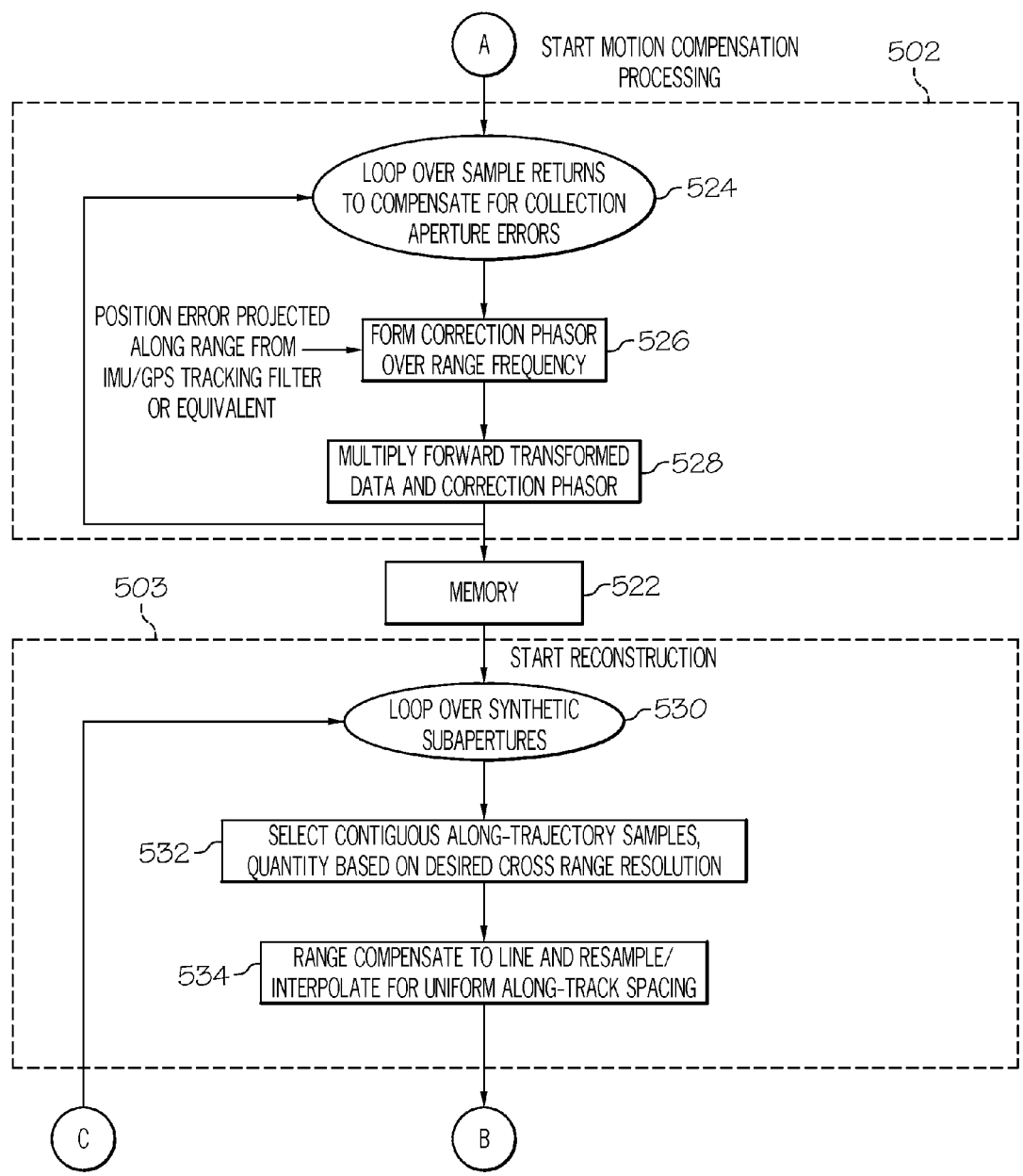
Figure 5C:
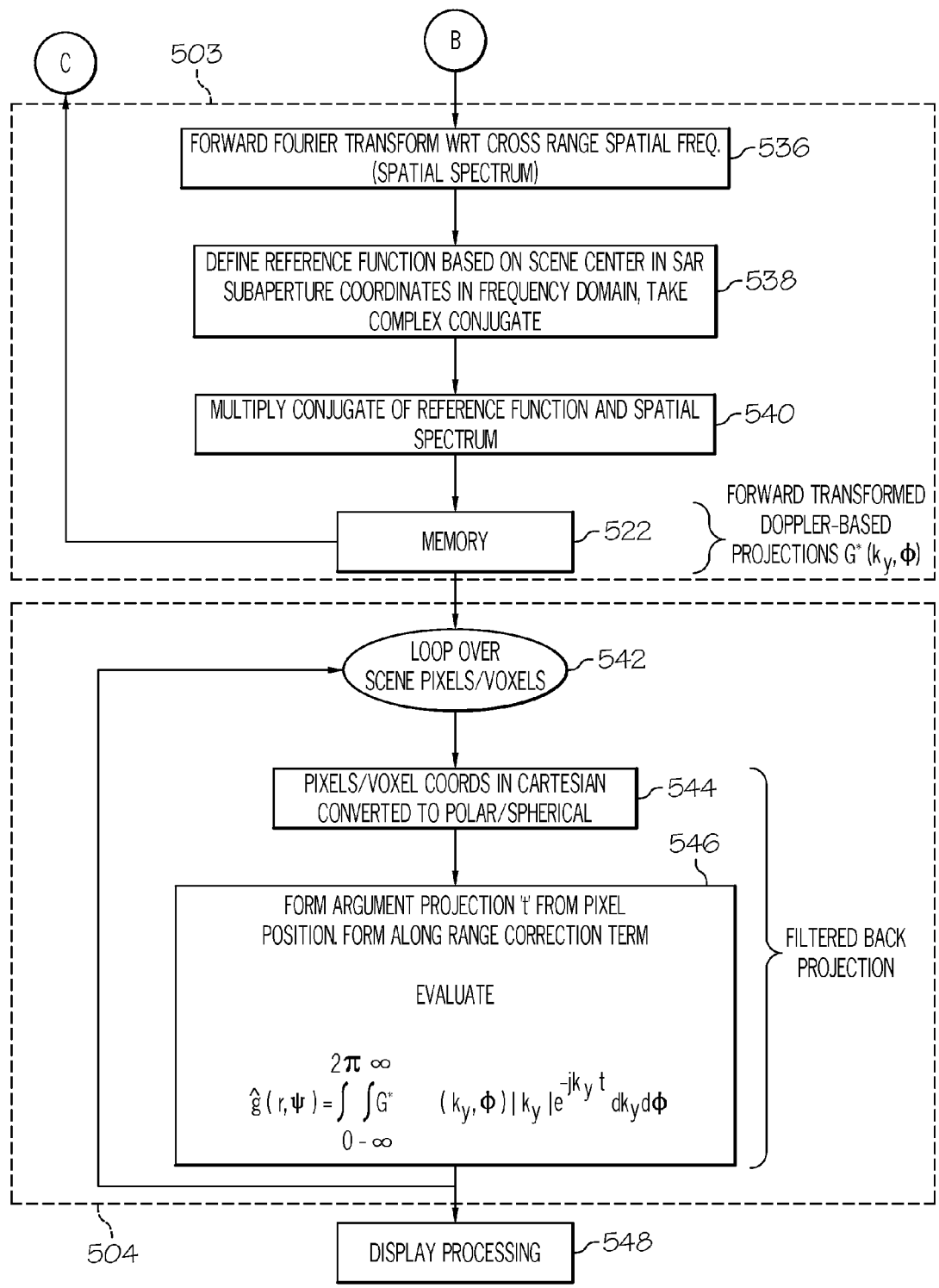

FIGS. 5A-5C (collectively FIG. 5) are a flow chart of an example of a method 500 for image reconstruction in accordance with an embodiment of the present disclosure. The method 500 may be embodied in or may be part of the method 100. The method 500 may also be embodied and performed by the system 400 in FIG. 4. Method 500 contains major functions 501 through 504. In block 501, the process of collecting the input data for the image reconstruction process (block 503) is outlined. A collection aperture may be started in block 506. In block 508 the process of collecting input data may be looped over a spatial aperture of the radar system at a radar pulse repetition frequency (PRF). The input data may consist of some pulsed waveform (although a continuous wave may also be employed if sufficient antenna support with acceptable isolation may be realized). In block 510, the pulsed waveform is created, amplified, and radiated toward the image scene by a radar system, such as radar system 400 in FIG. 4.

In block 512, the scattered energy is received and the signal may be conditioned before sampling. The signal may be conditioned by filtering by an analog process. Examples of filtering may include but is not limited to bandpass filtering, analogy matched filtering or other filtering to minimize noise contributions.

In block 514, the appropriately processed analog signal is Nyquist sampled, shown here as direct (Nyquist) sampling of the radio frequency (RF) signal without down conversion over a predetermined range window in each pulse repetition interval. The RF signal may be processed by an analog-to-digital converter (ADC (I, Q)) or similar device. Sampling may also be based on analog down conversion to a convenient intermediate frequency. The down converted signal may then sampled as dictated by the signal bandwidth of the return radar signals and as may be determined by an acceptable contribution to image quality resulting from range-angle modulation after matched filtering.

In block 516, the complex samples (I, Q data) are filtered to realize the optimum signal-to-noise ratio for the waveform employed. The filtering may be performed by pulse envelope matched filter or by any other process to provide the optimum signal-to-noise ratio. In block 518, decimation of excess samples and final range swath gating is performed. The response of the matched filter in range and the acceptable level of envelope scalloping of the range swath return will dictate the degree of decimation. Final gating will exclude undesirable returns from near or far range scatterers or scattering objects from contributing to a degradation of image quality. Operations in blocks 514-518 may be considered fast time processing.

In block 520, the sequence of range returns in each pulse repetition interval (PRI) may be coherently summed over the frequency range (effectively reducing waveform bandwidth) or forward Fourier transformed to account for waveform bandwidth in the image reconstruction process. If forward transformed the following operations (operations 502 through 504) are applied to each spectral component, followed by an inverse transform applied to each focused pixel/voxel over the frequency range. In other words, each Fourier frequency component is reconstructed independently, producing an image at each frequency. When all frequency components have been reconstructed, the inverse Fourier transform is applied on a pixel-by-pixel (or voxel-by-voxel) basis over all pixels in the reconstructed scene. No such consideration is necessary if the data are coherently summed over the range swath; resulting in a single complex data point per pulse repetition interval (PRI). The data may be referred to as "aperture samples" or "samples" in blocks 502-504. The input data may be the return or backscattered radar signals received by the radar system 400. The input data may include radar signal pulse number and time spanning a full temporal aperture of the tomographic aperture. The input data may be stored in a memory 522.

In block 502, the data may be compensated for errors in platform motion or vehicle motion from the ideal trajectory to that realized during data collection (motion compensation or mocomp). Operations beginning at block 502 assume that the fast time data were coherently summed over the range swath. A deviation from an ideal trajectory may be determined. Examples of techniques for compensating for motion and any deviation from an ideal trajectory of the vehicle may be compensated by scene-based autofocus, spatial estimation, hybrid techniques or similar motion compensation techniques.

In block 524, the motion compensation process may be looped over sample returns to compensate for collection aperture errors.

In block 526, a range error is used to calculate compensation phasors which may be multiplied with the complex summed range data in block 528, for each PRI. A correction phasor may be formed over the range frequency using a position error or range error projected along the range from an inertial measurement unit (IMU) and/or global positioning system (GPS) tracking filter or a similar device. The forward transformed data may be multiplied by the correction phasor in block 528 to provide the position or range error for motion compensation. The method 500 may then return to block 524 and motion compensation may be looped over a pulse index of the received radar signal data comprising the tomographic aperture. The resulting data may be stored in memory 522.

In block 503, a synthetic subaperture may be formed producing the Doppler-based projections. The position (size and overlap) of the subapertures composing the tomographic aperture are determined based on the required scene size (and bounded by the intersection of antenna patterns, for example antenna patterns 204a-204c in FIG. 2) and the required cross range resolution. The reconstruction of the image is performed by looping over the synthetic subapertures in block 530.

Figure 6:
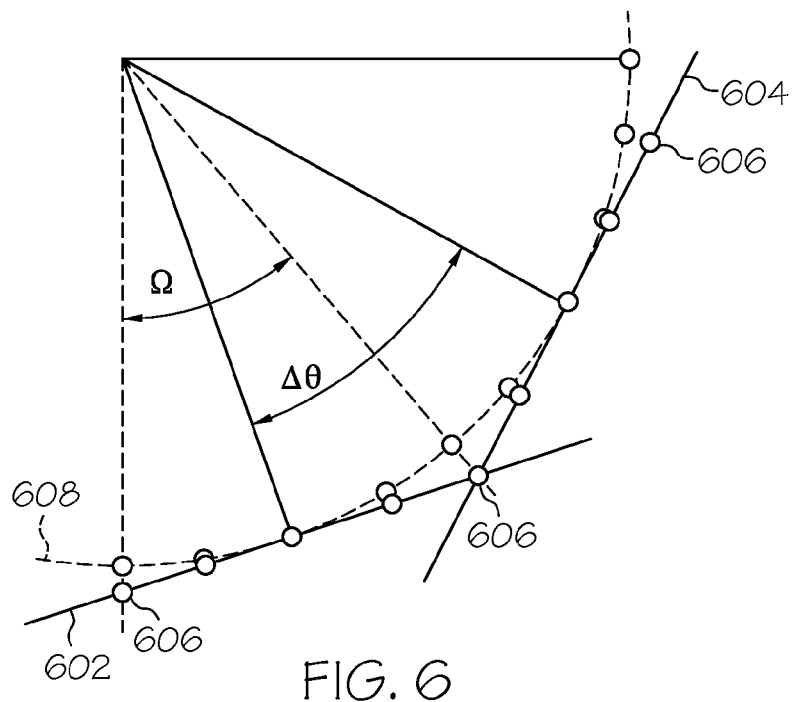
FIG. 6 is an illustration of an example of interpolation and compensation to a line of data samples and motion compensation to a circle in accordance with an embodiment of the present disclosure.

In block 532, the set of contiguous samples are selected to form a single subaperture. The quantity of selected contiguous samples may be based on a desired cross range resolution. In block 534, the contiguous samples are range compensated to a line (representing a linear collection aperture in customary synthetic aperture radar application) and may be resampled at uniform intervals along the linear aperture formed for uniform along-track spacing. Referring also to FIG. 6, FIG. 6 illustrates the process of blocks 532 and 534. FIG. 6 is an illustration of an example of interpolation and compensation to a line 602 and 604 of the data samples 606 which may be contiguous samples to form a synthetic subaperture. The samples are motion compensated as described herein to a circle 608 (two-dimensional aperture).

In block 536, the sampled data are then forward Fourier transformed with respect to cross range position and spatial frequency (spatial spectrum). A windowing or taper may be employed in block 536. In block 538, a reference function may be defined based on the location of the scene center (in like manner to the Range Migration Algorithm—RMA) in SAR subaperture coordinates in the frequency domain and the complex conjugate of the reference function taken. In block 540, the complex conjugate of the reference function may be multiplied by the spatial spectrum or the forward transformed result from block 536. This method, applied below, would apply only once to each synthetic subaperture.

Another approach, which is computationally less efficient, would be to select the reference point as the position of the pixel/voxel being focused as it projects onto the range, to generate the reference function. This shifts blocks 538 and 540 into bigger block 504. Other reference function algorithms may be established or selected based on the collection geometry or geometric relationship between a target to be imaged and the collection aperture.

In block 504, the image reconstruction process is carried out. In block 542, a variation of filtered back projection is employed that may be looped over pixels/voxels. The adaptation is specific to the formation of Doppler-based projections in block 503. In block 544, a pixel or voxel may be identified in scene-centered Cartesian coordinates and then translated into polar or spherical coordinates for two-dimensional or three-dimensional image reconstruction.

In block 546, reconstruction for each pixel requires a double integral to be evaluated over the collection aperture, or for each voxel a three dimensional integral is evaluated. For the two-dimensional (2D) case for filtered back projection using Doppler based projections, which may be extended to three-dimensions as described above, given a locus of integration 't' that results in a projection set, the method of filtered back projection produces a reconstruction (estimate) of the sampled scene using equation (1):

$$\hat{g}(r, \psi) = \int_0^{2\pi} \int_{-\infty}^{\infty} G*(k_y, \phi)|k_y|e^{-jk_y t} dk_y d\phi \quad \text{(Eq. 1)}$$

Where equation 2:

$$G*(k_y, \phi = \phi_m) = \left(\int_{y_{min}}^{y_{max}} g(y_{SAR}, \phi_m)e^{-jk_y y_{SAR}} dy_{SAR}\right) Y_{ref}(x_{pixel}, k_y) \quad \text{(Eq. 2)}$$

Is the forward transform with respect to cross range ($y_{SAR}$) of the contiguous samples (g) selected for a the synthetic subaperture centered at angle $\phi_m$ of rotation with respect to a scene defined coordinate frame, multiplied by the complex conjugate of the reference function in the spatial frequency domain ($Y_{ref}$) where the range (in the SAR subaperture coordinate frame) of the pixel being reconstructed defines the reference point for the reference function. $Y_{ref}$ will be a construct representative of RMA synthetic aperture radar focusing. A continuous integral has been used for notational convenience.

The contour of integration 't' is equivalent to a "fan" of lines radiating outward from the midpoint of the $\phi_m$ synthetic subaperture, each line of the fan representing a line of constant Doppler (hence the Doppler projection). In 2D this is given by equations 3 and 4:

$$t = L\sin(\gamma) \quad \text{(Eq. 3)}$$

Where $$\gamma = \tan^{-1}\left(\frac{r\sin(\psi - \phi)}{r\cos(\psi - \phi) - R_r}\right) \quad \text{(Eq. 4)}$$

Figure 7:
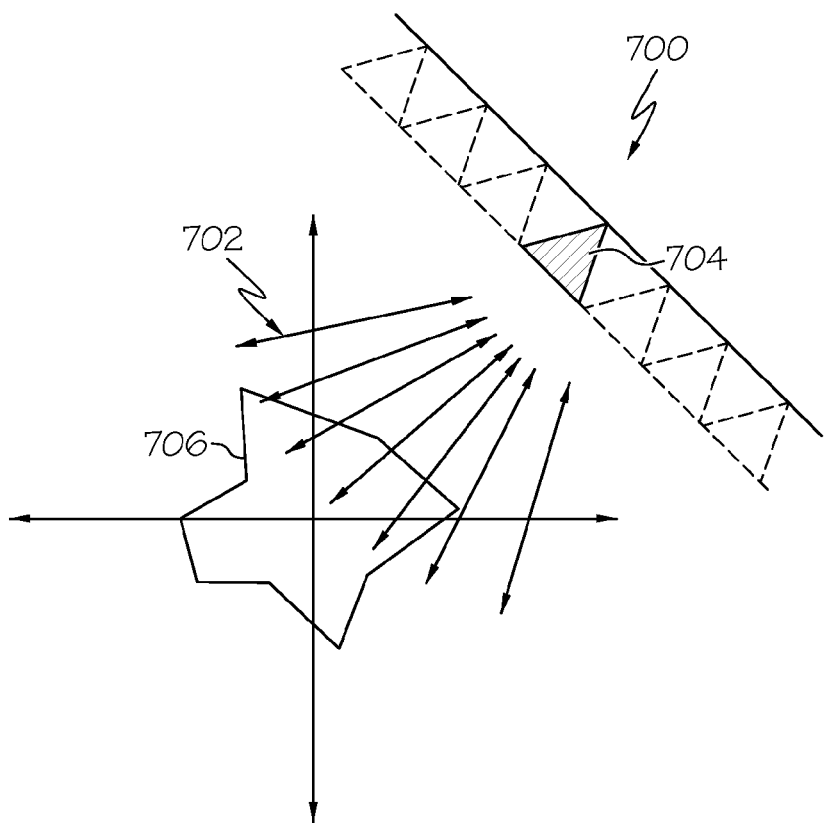
FIG. 7 is an illustration of a two-dimension synthetic aperture radar (SAR) subaperture showing a fan-like realization of Doppler-based projections relative to a scene or target area in accordance with an embodiment of the present disclosure.
Figure 8:
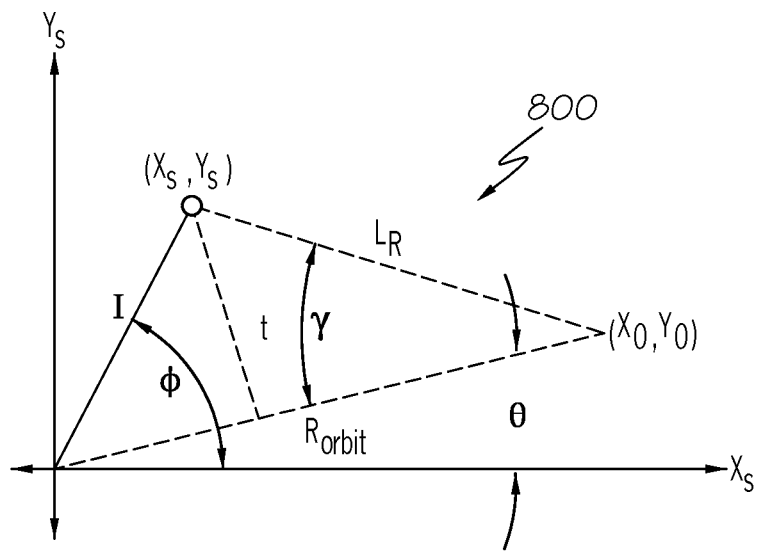
FIG. 8 is a representation of a two-dimension synthetic aperture radar illustrating converting pixel/voxel Cartesian coordinates to polar/spherical coordinates in accordance with an embodiment of the present disclosure.
Figure 9:
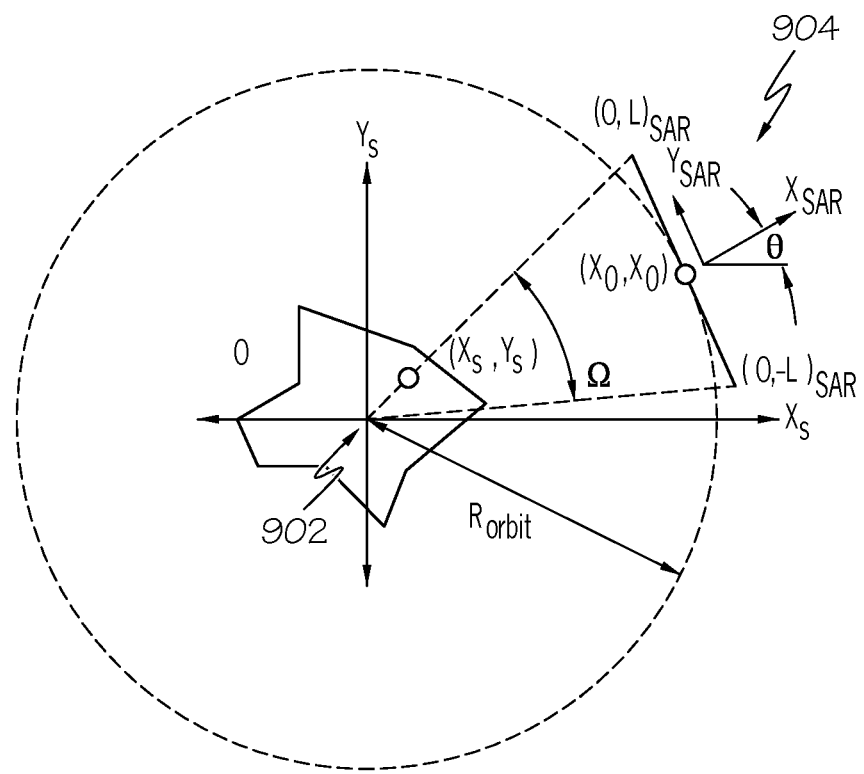
FIG. 9 is a representation of a two-dimensional tomographic geometry illustrating scene coordinates and synthetic aperture radar subaperture coordinates in accordance with an embodiment of the present disclosure.

Where: $R_f$ is the radial distance to the pixel, $\Psi$ is the polar angle in scene coordinates and $\phi$ is the rotation angle around the scene. L is the distance from the SAR subaperture midpoint to the pixel. Referring also to FIGS. 7, 8 and 9, FIG. 7 is a representation of a 2D SAR subaperture 700 showing projections 702. FIG. 8 is another representation of a 2D SAR subaperture 800 illustrating converting pixel/voxel Cartesian coordinates to polar/spherical coordinates as in block 544. FIG. 9 is a representation of a 2D tomographic geometry illustrating scene coordinates 902 and SAR subaperture coordinates 904. The 2D geometry consists of a platform carrying a radar, for example a monostatic radar, moving at a constant angular rate ($\theta$) at a radius $R_{orbit}$ from a scene-referenced Cartesian coordinate frame uniformly sampling over aperture angle $\Omega$.

In block 548, display processing may be performed and the reconstructed image may be presented.

Figure 10:
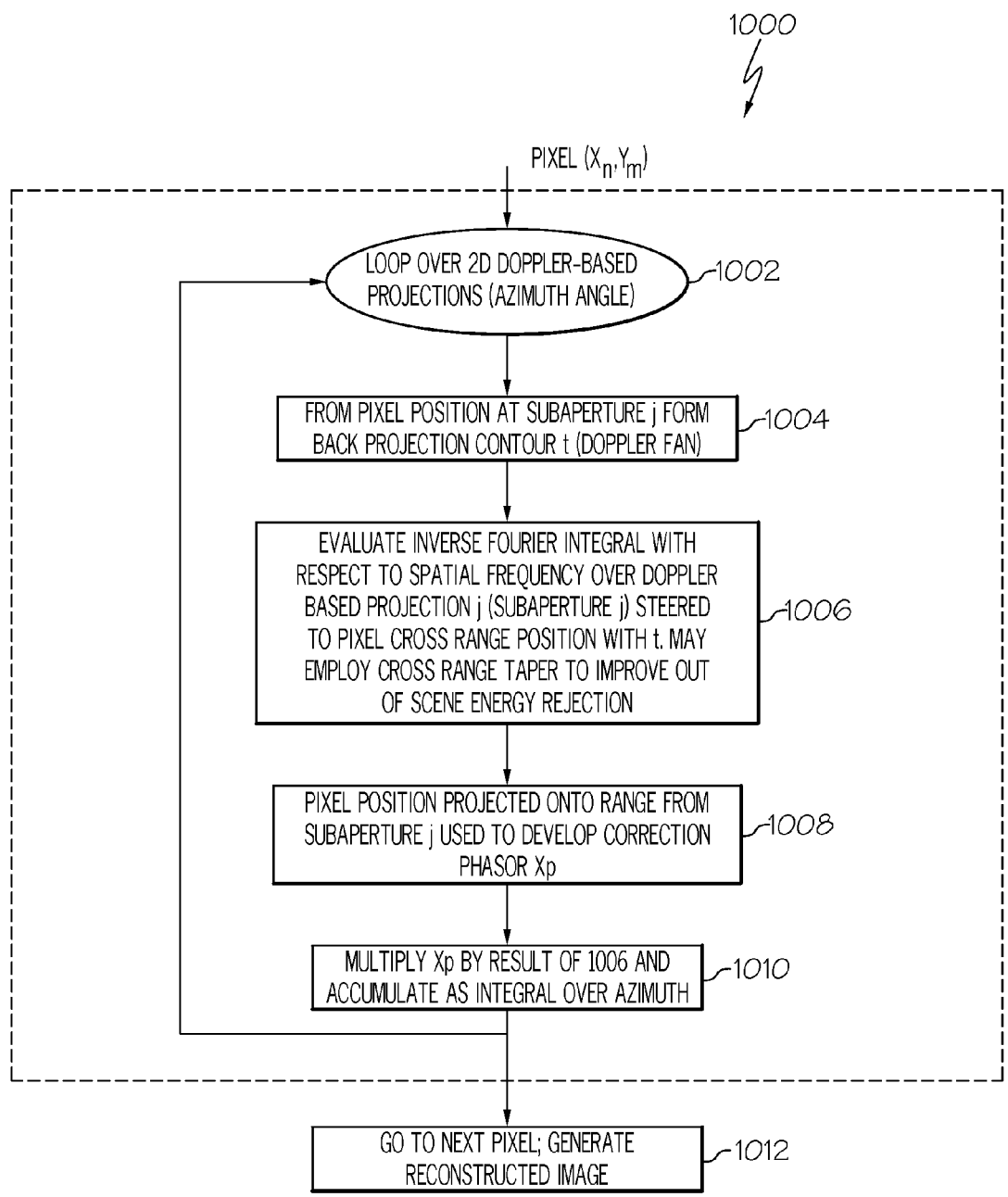
FIG. 10 is a flow chart of an example of a method for reconstructing each pixel using filtered back projection in accordance with an embodiment of the present disclosure.

Referring also to FIG. 10, FIG. 10 is a flow chart of an example of a method 1000 for reconstructing each pixel that may be used in block 546. The specific case of two dimensional (2D) reconstruction is described with reference to FIG. 10 for purposes of explanation; however, those skilled in the art will recognize that the methodology can be extended to a three dimensional reconstruction.

In block 1002, the process is looped over 2D Doppler-based projections representing a realization of a numerical integral over the range of angles collected around the scene, such as scene or target area 206 in FIG. 2, specifically applied to a single arbitrary pixel.

In block 1004, at each subaperture T position the pixel position may be used to define the back projection contour 't'. This contour corresponds to a fan-like realization of Doppler-based projections. FIG. 7 is an illustration of a 2D SAR subaperture 700 showing a fan-like realization of Doppler-based projections 702 for a particular subaperture position 704 relative to a scene 706 or target area.

In block 1006, a numerical integral representing an inverse Fourier transform with respect to spatial frequency that is steered to coutour 't' is evaluated. To improve the out-of-scene energy rejection or rejection of return signals from other scatterers or signal scattering objects outside the scene or target area of interest, and thereby realize a main advantage of this technique (that of angle gating the measured data), this inverse transform may employ a cross range windowing or tapering function. The windowing function is to reduce the response sidelobes at all angles away from the steered pixel (voxel) position.

In block 1008, the projection of the pixel position into range from this subaperture position is used to construct a correction phasor Xp. In block 1010, the correction phasor Xp is multiplied with the inverse transform result and cumulated with the numerical integral over the azimuth angle as the process loops back through block 1002. The set of voxels defined and processed may be aided through the use of digital terrain maps to bind the processing complexity only to a region of specific interest.

In block 1012, the next pixel may be processed by the method 1000 and the reconstructed image may be generated from the processed pixels or voxels and presented.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated.

Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A method for generating an image, comprising:
    translating a radar system about a target area at a selected angular rate and at a predetermined radius from the target area;
    transmitting a plurality of radar signals in a predetermined frequency range from the radar system as the radar system is translated about the target area;
    collecting a plurality of backscattered radar signals from the target area resulting from the plurality of transmitted radar signals;
    forming a plurality of Doppler-based projections from the plurality of backscattered radar signals; and
    generating an image of the target area using radar tomography and the Doppler-based projections.

2. The method of claim 1, wherein translating the radar system about the target area comprises translating the radar system about the target area at a constant angular rate.

3. The method of claim 1, wherein translating the radar system about the target area comprises translating the radar system about the target area at a predetermined height above the target area by an aerial vehicle.

4. The method of claim 1, further comprising uniformly sampling the backscattered radar signals over an aperture angle of the radar system.

5. The method of claim 4, further comprising combining the sampled backscattered radar signals into a plurality of contiguous blocks to meet tomographic scene size requirements, wherein the contiguous blocks form the Doppler-based projections suitable for back-projection image reconstruction.

6. The method of claim 1, wherein transmitting the plurality of radar signals comprises transmitting narrow bandwidth radar signals that comprise instantaneous bandwidths that are less than about 10% of a frequency of a carrier of the radar signals.

7. The method of claim 1, wherein transmitting the plurality of radar signals comprises transmitting narrow bandwidth radar signals that comprise a frequency of less than about 40 megahertz at a carrier frequency of about 400 megahertz.

8. The method of claim 1, further comprising illuminating the target area by a mainbeam of the radar system over a complete trajectory of the radar system, wherein intersection of radar patterns of the mainbeam as the radar system is translated about the target area define the target area.

9. The method of claim 8, further comprising delimiting a range of the radar system by retaining range values in the intersection of the main beam footprint.

10. The method of claim 1, further comprising compensating for motion of the radar system about the target area.

11. The method of claim 10, wherein compensating for the motion of the radar system comprises at least one of:
    determining a deviation of a trajectory of a radar beam from the radar system from an ideal trajectory;
    performing a forward transformation of a range of the radar system;
    using a multiple compensation phasor; and
    using inverse transformation.

12. The method of claim 1, further comprising:
    performing filtered back propagation with the Doppler based projections to generate a three-dimension image of the target area; and
    using azimuth gating as enabled by the Doppler based projections to constrain contribution of any out-of-scene scattering objects to degradation of a quality of a reconstructed image.

13. The method of claim 12, wherein performing the filtered back propagation with the Doppler-based projections comprises performing the filtered back propagation by looping over a plurality of voxels to generate the three-dimensional image.

14. A system for generating an image, comprising:
    a radar system mountable to a vehicle for translating the radar system about a target area at a selected angular rate and at a predetermined radius from the target area;

an antenna associated with the radar system that transmits a plurality of radar signals in a predetermined frequency range from the radar system as the radar system is translated about the target area;

a collection aperture that collects a plurality of backscattered radar signals from the target area resulting from the plurality of transmitted radar signals; and a processor adapted to form a plurality of Doppler-based projections from the plurality of backscattered radar signals and to generate an image of the target area using radar tomography and the Doppler-based projections.

15. The system of claim 14, wherein the vehicle comprises an aerial vehicle that translates the target about the target at a predetermined height above the target.

16. The system of claim 14, further comprising a module to uniformly sample the backscattered radar signals over an aperture angle of the radar system.

17. The system of claim 16, further comprising a module for combining the sampled backscattered radar signals into a plurality of contiguous blocks to meet tomographic scene size requirements, wherein the contiguous blocks form the Doppler-based projections suitable for back-projection image reconstruction.

18. A computer program product for generating an image, the computer program product comprising:

a non-transitory computer readable storage medium having computer readable program code embodied therewith, the computer readable program code comprising:

computer readable program code configured to cause a radar system to transmit a plurality of radar signals in a predetermined frequency range from the radar system as the radar system is translated about a target area;

computer readable program code configured to cause the radar system to collect a plurality of backscattered radar signals from the target area resulting from the plurality of transmitted radar signals;

computer readable program code configured to form a plurality of Doppler-based projections from the plurality of backscattered radar signals; and computer readable program code configured to generate an image of the target area using radar tomography and the Doppler-based projections.

19. The computer program product of claim 18, further comprising:

computer readable program code configured to cause the radar system to uniformly sample the backscattered radar signals over an aperture angle of the radar system; and computer readable program code configured to combine the sampled backscattered radar signals into a plurality of contiguous blocks to meet tomographic scene size requirements, wherein the contiguous blocks form the Doppler-based projections suitable for back-projection image reconstruction.

20. The computer program product of claim 18, further comprising computer readable program code configured to perform filtered back propagation with the Doppler-based projections to generate a three-dimension image of the target area.

* * * * *

UNITED STATES PATENT AND TRADEMARK OFFICE
CERTIFICATE OF CORRECTION

PATENT NO. : 9,176,226 B1
APPLICATION NO. : 13/420083
DATED : November 3, 2015
INVENTOR(S) : Daniel J. Sego Page 1 of 1

It is certified that error appears in the above-identified patent and that said Letters Patent is hereby corrected as shown below:

IN THE CLAIMS:

In column 12, line 32, please change line 32 to:

"megahertz of a carrier comprising a frequency of about 400 megahertz."

Signed and Sealed this
Fifth Day of July, 2016

Michelle K. Lee
*Director of the United States Patent and Trademark Office*